June 21, 1932. C. G. STRANDLUND 1,863,812

PLOW

Filed July 5, 1929

Inventor
Carl G. Strandlund
By Brown, Jackson, Boettcher &
Dienner
Attorneys

Patented June 21, 1932

1,863,812

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

PLOW

Application filed July 5, 1929. Serial No. 376,093.

The present invention relates to plows and has particular reference to improvements in depth adjusting mechanism for plows.

Broadly stated, the object of the invention is to provide depth adjusting means which will enable comparatively fine adjustments to be made at the shallow plowing depths. Shallow plowing is generally followed in plowing sod and in breaking prairie land. Due to the yield in the construction of the plow and to the conditions of the sod it is frequently difficult to maintain a shallow plowing adjustment. That is to say, in setting the implement for a plowing depth of one or two inches the spring in the implement frame and the conditions of the sod may result in the plow bottoms being actually forced down to a much greater depth.

To counteract this it is, therefore, desirable to be able to make relatively fine depth adjustments when operating at these shallow plowing depths.

One of the features of the present invention is the ability to obtain these relatively fine adjustments at shallow plowing depths, while still leaving normal or comparatively coarse adjustments at the deeper plowing depths. Fine adjustments are not necessary at the deeper plowing depths, and if these fine adjustments were present during this latter range of adjustment the range of movement of the manually operated adjusting lever would be excessive.

The present depth adjusting means has preferred association with a supporting wheel mounted on a swinging crank axle, such as is common in power lift plows. This swinging crank axle has the inherent tendency to give a finer measure of adjustment at the shallow plowing depths than at the deep plowing depths; that is to say, when the axle is extending at an angle closely approaching the horizontal, corresponding to a deep plowing depth, a given angular movement of the axle will cause a relatively large vertical adjustment of the plow frame, whereas when the axle is at a pronounced angle to the horizontal, corresponding to a shallow plowing depth, this same angle of movement of the axle will result in a much smaller vertical movement of the plow frame.

The present depth adjusting mechanism utilizes this inherent action of the crank axle but augments the same by transmitting a lesser amount of angular movement to the crank axle at the shallow plowing depths than at the deep plowing depths.

Figure 1:
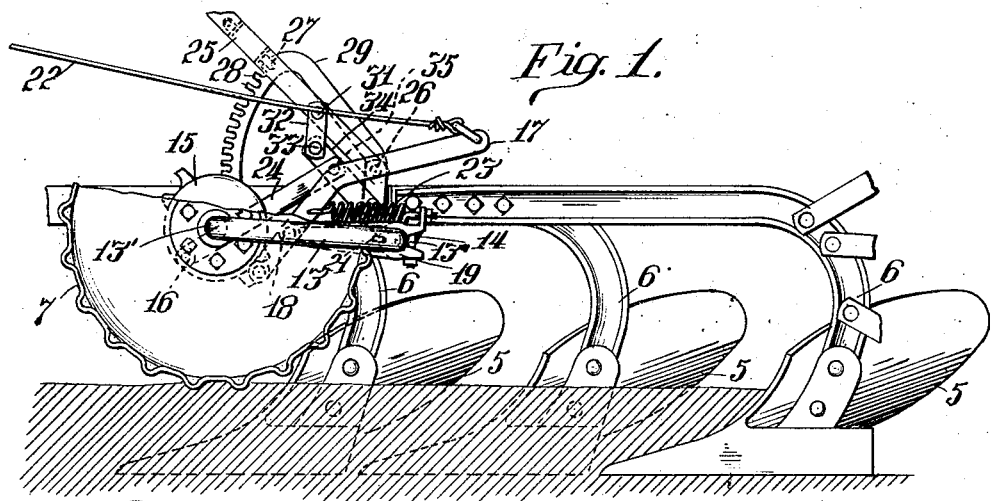
Figure 2:
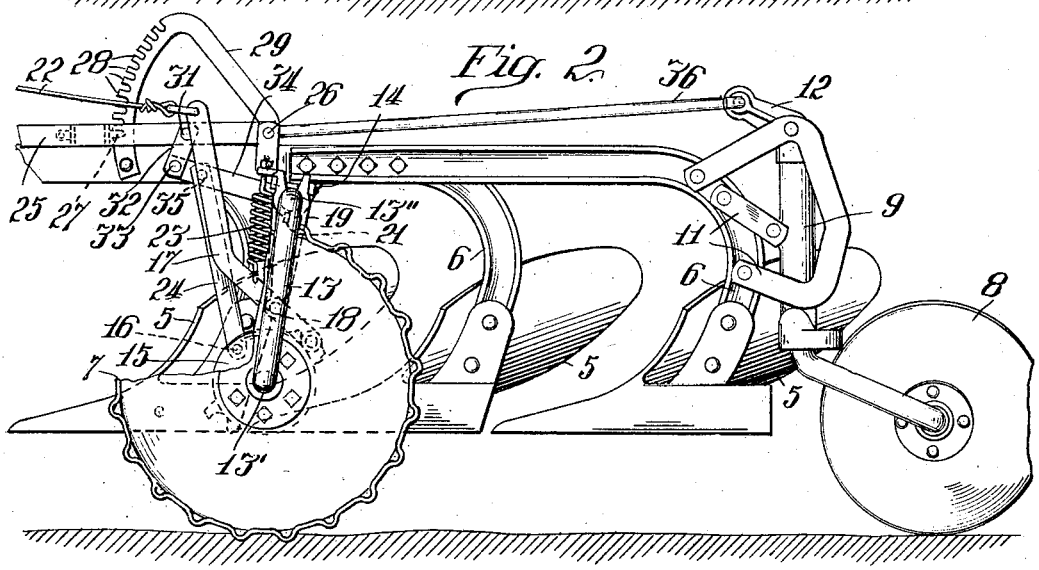
Figure 3:
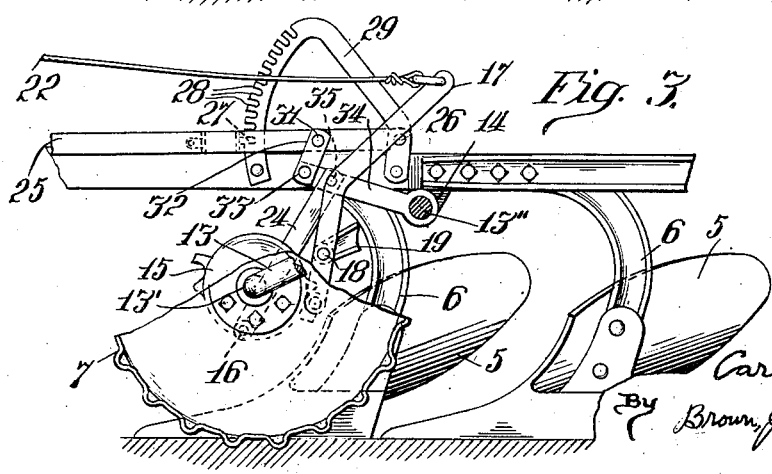

Other objects and advantages of the invention will appear from the following description of a preferred embodiment thereof. In the accompanying drawing illustrating such embodiment:

Figure 1 is a fragmentary side view of a plow to which my invention has been adapted, the plow being shown at a deep plowing depth, Figure 2 is a similar view showing the plow raised to transport position from a shallow depth adjustment, and Figure 3 illustrates the same in plowing position at a shallow depth adjustment.

The implement comprises a plurality of plow bottoms 5 which may be either of the moldboard or disc type each supported on beams 6, these beams making up the frame of the implement, such being a practice commonly followed in plow design. It will be understood that the invention is not limited to any specific design of plow.

Such type of plow is usually supported on a landwheel 7, a rear furrow wheel 8, and a front furrow wheel which is not shown in the drawing. The frame is supported on each of these wheels through lifting connections by which the frame may be raised and lowered. The rear furrow wheel 8 is shown as having swiveled mounting in a sleeve 9 which is connected with the frame through suitable link mechanism 11 comprising a lifting lever 12 through the actuation of which the frame may be raised and lowered relatively to this rear furrow wheel, the specific construction of this link mechanism 11 being old and well known.

The landwheel 7 is mounted on a swinging crank axle 13 which has its upper transverse portion journaled in bearings 14 (Figure 3) carried by the frame, the wheel being supported on the lower inwardly turned end 13′ of said crank axle. Mounted on this spindle end 13′ is a power lift clutch 15 comprising a driving clutch element rotating with the landwheel 7 and a driven clutch element adapted to be rotated through half revolutions by the driving clutch element. Such type of clutch is well known and need not be described in detail, it being sufficient to say that the tripping or engagement of the clutch transmits the traction power of the land wheel to a crank pin 16 for causing the latter to swing through a half revolution about the axis of the landwheel.

The clutch is engaged by the actuation of a tripping lever 17 which is pivotally mounted at 18 on an arm 19 extending downwardly from the upper transverse portion of the crank axle. This arm 19 is rigidly clamped to the axle by means of a clamping bolt and key generally indicated at 21. A rope 22 extends forwardly from the upper end of the tripping lever 17 to the tractor so that the operator can trip the lever 17 from his seat on the tractor when it is desired to raise or lower the plow between plowing and transport positions. Figures 1 and 3 illustrate plowing positions, and Figure 2 illustrates the transport position. A suitable spring 23 is usually connected to the tripping lever 17 for normally holding the latter in position to cause disengagement of the clutch and locking of the driven clutch element.

A link 24 is pivotally mounted on the crank pin 16 and extends upwardly therefrom for effecting operative connections with my improved depth adjusting mechanism. Such mechanism comprises a manually actuated depth adjusting lever 25 which extends forwardly to a point where it may be conveniently actuated by the operator from his position on the tractor. This lever is supported on the frame on a pivot 26 and carries a suitable latching dog 27 engageable in teeth 28 formed in an arcuate latching sector 29, whereby the lever may be held in its different positions of depth adjustment.

Pivotally connected at 31 to said lever is a link 32 which extends downwardly and has pivotal attachment at 33 with a lower arm or lever 34. This arm or lever 34 is supported on the frame on a pivot axis which is preferably disposed below and slightly to the rear of the pivot axis 26. Preferably, such member 34 is mounted on the crank axle 13, the upper transverse portion 13″ representing the pivot axis of said member. The upper end of the power lift link 24 is pivotally connected with the arm or lever 34 at the pivot pin 35. In the power lift operation the swing of the crank pin 16 reacts through the link 24 against the pivot 35, which pivot at this time is stationary with respect to the frame, thereby causing the crank axle 13 and landwheel 7 to swing backwardly for raising the frame to the transport position illustrated in Figure 2. Such lifting movement is also transmitted to the front and rear furrow wheels through suitable motion transmitting connections, one of these connections being represented by the rod 36 extending forwardly from the rear lifting arm 12 and connecting with an arm (not shown) extending upwardly from the upper transverse portion 13″ of the crank axle.

The fine depth adjustments desired at the shallow plowing depths are obtained in the present structure by interposing the motion transmitting lever 34 between the depth adjusting lever 25 and the lifting bar 24, and by disposing the pivots 13″, 26, 31, 33 and 35 substantially in the relation shown. Referring to Figure 3, when the depth adjusting lever 25 is engaging in the lowermost notch 28 of the sector 29 the crank axle 13 is extending downward at a considerable angle to the horizontal, corresponding to the shallowest plowing adjustment. It will be observed that at this time the motion transmitting link 32 extends at a pronounced angle to the two levers 25 and 34. As the depth adjusting lever 25 is moved upwardly to the next notch the motion transmitting lever 34 is moved upwardly a relatively short distance, the lower pivot 33 swinging backward slightly with respect to the upper pivot 31 owing to the eccentricity between the supporting pivots 13″ and 26. Further movement of the depth adjusting lever from the second notch to the third results in an angular movement of the motion transmitting lever 34 of slightly larger extent. That is to say, when the depth adjusting lever 25 is moved through a unit of adjustment from the second notch to the third the motion transmitting lever 34 is moved upwardly through a slightly larger angle than when the depth adjusting lever is moved through the unit of adjustment from the first notch to the second.

The angular movement of the motion transmitting lever continues to increase in this manner per unit of adjustment of the depth adjusting lever until the latter reaches the upper end of the latching sector 29, corresponding to a maximum depth of plowing adjustment. Such position is illustrated in Figure 1, and it will be noted that at this time the link 32 extends at an angle more nearly in alignment with the two levers 25 and 34.

It will hence be seen from the foregoing that inasmuch as the crank axle 13 swings substantially as a unit with the motion transmitting lever 34 in this depth adjusting operation, the angular movement through which said crank axle is swung relatively to each unit of angular movement of the depth adjusting lever will be comparatively small at the shallow plowing depths and comparatively larger at the deeper plowing depths.

As previously remarked, the pivotal movement of the crank axle has an inherent tendency to give a finer adjustment at the shallow plowing depths when the axle is at a more pronounced angle to the horizontal, but the present motion transmitting connections between the depth adjusting lever 25 and the crank axle augment this characteristic by transmitting a smaller degree of angular movement to said crank axle relatively to the angular movement of the depth adjusting lever when said lever is moving through its range of shallow depth adjustments than when said lever is moving through its range of deep depth adjustments.

By virtue of the present construction the notches 28 may all be of equal spacing, the adjustment of the plow is more rapidly acting in the deeper depth adjustments where fine adjustments are not necessary, and the length of the lever 25 and its range of movement are confined so that the lever can be operated conveniently from the tractor seat.

The fine depth adjustments desired at shallow plowing depths are obtained directly from the ingenious arrangement of links, and particular attention is directed to links 32 and 24. The latter are connected in series since link 32 is pivotally connected with the depth adjusting lever 25 and link 24 is pivotally connected with crank pin 16, while the other ends of the links are pivotally joined by lever 34. In this manner the serially related links 32 and 24 form a direct connection between the depth adjusting lever and the wheel for effecting the above described depth adjustments of the plow as determined by the movement of the depth adjusting lever.

Links 32 and 24 also function in the capacity of a toggle joint between the depth adjusting lever and the connection with the wheel, the toggle action being controlled by the common connecting lever 34 as it swings about its pivotal mounting on the implement. Lever 34 breaks the toggle when the plows are in deep plowing position (see Figure 1) and tends to straighten the toggle when the plows are in shallow plowing position.

It will be understood that the relative arrangement of the two pivot axes 13" and 26 and their mounting on the frame may be varied from the construction shown without departing from the invention, and the same is true of the relative arrangement of the pivot centers 31, 33 and 35.

For example, the upper end of the lifting bar 24 may be pivotally connected to the lever 34 at the pivot 33 instead of at the point 35. In either arrangement the link 32 and lifting bar 24 function as two serially related links having toggle joint action between the depth adjusting lever 25 and the crank pin 16, such toggle joint action following irrespective of whether the link 24 is pivoted at 35 or 33.

It will be noted that the arm or lever 34 controls the flexing point of this toggle connection.

I claim:

1. In a power lift plow, the combination of a frame carrying a plow body, a crank axle comprising an upper transverse portion pivotally mounted on said frame, a supporting wheel journaled on the swinging end of said crank axle, a power lift clutch comprising driving and driven clutch members mounted on said crank axle concentrically of said wheel, said driving clutch element rotating with said wheel, a crank pin on said driven clutch element, a lifting bar pivotally connected at its lower end with said crank pin, a motion transmitting lever pivotally supported at its rear end on said upper transverse portion of the crank axle, said lifting bar being pivotally connected with said motion transmitting lever adjacent to the forward end thereof, a manually operated depth adjusting lever pivotally supported at its rear end on said frame on a pivot axis disposed above and forward of the axis of said upper transverse crank axle portion, a motion transmitting link, means pivotally connecting the upper end of said link with said depth adjusting lever, and means pivotally connecting the lower end of said link with the front end of said motion transmitting lever beyond said lifting bar, whereby said crank axle is swung through a smaller degree of angular movement relatively to the angular movement of said depth adjusting lever in the shallow plowing depth adjustments than in the deep plowing adjustments.

2. In a power lift plow, the combination of a frame carrying a plow body, a crank axle comprising an upper transverse portion pivotally mounted on said frame, a supporting wheel journaled on the swinging end of said crank axle, a power lift clutch comprising driving and driven clutch members mounted on said crank axle concentrically of said wheel, a lifting bar pivotally connected with said driven clutch member, a motion transmitting lever pivotally supported on said upper transverse portion of the crank axle, means pivotally connecting said lifting bar with said motion transmitting lever, a manually operated depth adjusting lever pivotally supported on said frame on a pivot axis disposed above and forward of the axis of said upper transverse crank axle portion, a motion transmitting link, means pivotally connecting the upper end of said link with said depth adjusting lever, and means pivotally connecting the lower end of said link with the swinging end of said motion transmitting lever, whereby said crank axle is swung through a smaller degree of angular movement relatively to the angular movement of said depth adjusting lever in the shallow plowing depth adjustments than in the deep plowing depth adjustments.

3. In a power lift plow, the combination of a frame carrying a plow body, a crank axle pivotally mounted on said frame, a supporting wheel journaled on the swinging end of said crank axle, a power lift clutch comprising driving and driven clutch members mounted on said crank axle concentrically of said wheel, a lifting bar pivotally connected with said driven clutch member, a motion transmitting lever pivotally supported at its rear end on said frame, means pivotally connecting said lifting bar with said motion transmitting lever adjacent to the forward end of the latter, a manually operated depth adjusting lever pivotally supported on said frame on a pivot axis disposed above and forward of the pivot axis of said motion transmitting lever, a motion transmitting link, means pivotally connecting the upper end of said link with said depth adjusting lever, and means pivotally connecting the lower end of said link with the front end of said motion transmitting lever beyond said lifting bar, whereby said crank axle is swung through a smaller degree of angular movement relatively to the angular movement of said depth adjusting lever in the shallow plowing depth adjustments than in the deep plowing depth adjustments.

4. In a power lift plow, the combination of a frame carrying a plow body, a crank axle pivotally mounted on said frame, a supporting wheel journaled on the swinging end of said crank axle, a power lift clutch driven by said wheel, a lifting bar pivotally connected with said clutch, a motion transmitting lever pivotally supported on said frame, means pivotally connecting said lifting bar with said motion transmitting lever, a manually operated depth adjusting lever pivotally supported on said frame above the pivot axis of said motion transmitting lever, a motion transmitting link, means pivotally connecting the upper end of said link with said depth adjusting lever, and means pivotally connecting the lower end of said link with said motion transmitting lever, whereby said crank axle is swung through a smaller degree of angular movement relatively to the angular movement of said depth adjusting lever in the shallow plowing depth adjustments than in the deep plowing depth adjustments.

5. In a power lift plow, the combination of a frame carrying a plow body, a supporting wheel relatively to which said frame is adapted to be raised and lowered, a power lift clutch driven by said supporting wheel, a lifting bar pivotally connected with said clutch, a motion transmitting lever pivotally supported on said frame, means pivotally connecting said lifting bar with said motion transmitting lever, a manually operated depth adjusting lever pivotally supported on said frame on a pivot axis disposed above the pivot axis of said motion transmitting lever, a motion transmitting link, means pivotally connecting the upper end of said link with said depth adjusting lever, and means pivotally connecting the lower end of said link with said motion transmitting lever, whereby said motion transmitting lever is swung through a smaller degree of angular movement relatively to the angular movement of said depth adjusting lever in the shallow plowing depth adjustments than in the deep plowing depth adjustments.

6. In a power lift plow, the combination of a frame carrying a plow body, a crank axle pivotally mounted on said frame, a supporting wheel journaled on the swinging end of said crank axle, a power lift clutch driven by said supporting wheel, a lifting bar pivotally connected with said clutch, a motion transmitting lever pivotally supported on said frame, said lifting bar being pivotally connected with said motion transmitting lever, a manually operated depth adjusting lever pivotally supported on said frame eccentrically with respect to the pivotal mounting of said motion transmitting lever, and a link pivotally connected between said depth adjusting lever and said motion transmitting lever, whereby said crank axle is swung through a smaller degree of angular movement relatively to the angular movement of said depth adjusting lever in the shallow plowing depth adjustments than in the deep plowing depth adjustments.

7. In a power lift plow, the combination of a frame carrying a plow body, a supporting wheel relatively to which said frame is adapted to be raised and lowered, a power lift clutch driven by said wheel, a lifting bar pivotally connected with said clutch, a motion transmitting lever pivotally supported on said frame, said lifting bar being pivotally connected with said lever, a manually operated depth adjusting lever pivotally supported on said frame eccentrically with respect to the pivotal axis of said motion transmitting lever, and a link connected between said depth adjusting lever and said motion transmitting lever, whereby said frame is raised and lowered through a smaller degree of vertical movement relatively to the angular movement of said depth adjusting lever in the shallow plowing depth adjustments than in the deep plowing depth adjustments.

8. In a plow, the combination of a frame carrying a plow body, a crank axle pivotally mounted on said frame, a supporting wheel journaled on the swinging end of said crank axle, a lifting bar operatively connected with said supporting wheel, a motion transmitting lever pivotally supported on said frame, said lifting bar being pivotally connected with said lever, a manually operated depth adjusting lever pivotally supported on said frame eccentrically with respect to the pivotal axis of said motion transmitting lever, and a link connecting said levers, whereby said frame is raised and lowered through a smaller degree of vertical movement relatively to the angular movement of said depth adjusting lever in the shallow plowing depth adjustments, than in the deep plowing depth adjustments.

9. In a plow, the combination of a frame carrying a plow body, a supporting wheel relatively to which said frame is adapted to be raised and lowered, a power lift clutch connected with said supporting wheel, a lifting bar operatively connected with said wheel through said power lift clutch, a motion transmitting lever pivotally supported on said frame, said lifting bar being pivotally connected with said lever, a manually operated depth adjusting lever pivotally supported on said frame eccentrically with respect to the pivotal axis of said motion transmitting lever, and a link connecting said levers, whereby said frame is raised and lowered through a smaller degree of vertical movement relatively to the angular movement of said depth adjusting lever in the shallow plowing depth adjustments than in the deep plowing depth adjustments.

10. In a plow, the combination of a frame carrying a plow body, a crank axle pivotally mounted on said frame, a supporting wheel journaled on said crank axle, a depth adjusting lever, a motion transmitting lever mounted on said crank axle and swinging relatively thereto, a link connecting said levers, and means actuated by the swinging of said motion transmitting lever for causing said crank axle to swing for raising and lowering said frame.

11. In a plow, the combination of a frame carrying a plow body, a crank axle pivotally mounted on said frame, a supporting wheel relatively to which said frame is adapted to be raised and lowered, a depth adjusting lever, a motion transmitting lever carried by said crank axle, a link connecting said levers, and means connecting said motion transmitting lever with said wheel whereby movement of said latter lever causes said frame to be raised and lowered relatively to said wheel.

12. In a power lift plow, the combination of a frame carrying a plow body, a crank axle pivotally mounted on said frame, a supporting wheel journaled on the swinging end of said crank axle, a power lift clutch driven by said wheel, a depth adjusting lever, and motion transmitting mechanism connected between said lever and said clutch comprising serially related links and means for controlling the pivotal connection between said links comprising a freely swinging link having one end thereof pivotally mounted on the frame on an axis coincident with the axis about which said crank axle swings and having its other end pivotally joining said serially related links, whereby said crank axle is swung through a smaller degree of angular movement relatively to the angular movement of said depth adjusting lever in the shallow plowing depth adjustments than in the deep plowing depth adjustments.

13. In a power lift plow, the combination of a frame carrying a plow body, a crank axle mounted on said frame, a supporting wheel carried thereby, power lift mechanism for causing said frame to be raised relatively to said supporting wheel, a depth adjusting lever, and toggle link mechanism connecting said lever with said power lift mechanism comprising a pair of links connected with said depth adjusting lever and said wheels, respectively, and having their free ends connected with one end of a swinging link mounted on said frame coaxially with the axis about which said crank axle swings, whereby said frame is raised and lowered through a smaller degree of vertical movement relatively to the angular movement of said depth adjusting lever in the shallow plowing depth adjustments than in the deep plowing depth adjustments.

14. In a plow, the combination of a frame carrying a plow body, a crank axle pivotally mounted on said frame, a supporting wheel journaled thereon relatively to which said frame is adapted to be raised and lowered, a depth adjusting lever, and toggle means connecting said depth adjusting lever with said wheel comprising a pair of links connected with said depth adjusting lever and said wheel, respectively, and having their free ends connected with one end of a swinging link mounted on said frame coaxially with the axis about which said crank axle swings, whereby said plow body is raised and lowered through a smaller degree of vertical movement relatively to the angular movement of said depth adjusting lever in the shallow plowing depth adjustments than in the deep plowing depth adjustments.

15. In a plow, the combination of a frame carrying a plow body, a crank axle pivotally mounted on said frame, a supporting wheel journaled on said crank axle, a depth adjusting lever mounted on said frame and extending substantially forwardly, a motion transmitting lever mounted on said frame below said depth adjusting lever and extending forwardly, a link connecting the aforesaid levers whereby said motion transmitting lever is brought into parallelism with said depth adjusting lever when the latter is moved to lower the plows, and means actuated by the swinging of said motion transmitting lever for causing said crank axle to swing for raising and lowering said frame.

16. In a plow, the combination of a frame carrying a plow body, a crank axle pivotally mounted on said frame, a supporting wheel journaled on said crank axle, a depth adjusting lever, a motion transmitting lever having one end thereof mounted on said frame at an axis coincident with the axis about which said crank axle swings, a link connecting said levers, and means actuated by the swinging of said motion transmitting lever for causing said crank axle to swing for raising and lowering said frame.

17. In a plow, the combination of a frame carrying a plow body, a supporting wheel having a swingable connection on said frame, the latter being adapted to be raised and lowered relative to said wheel, a depth adjusting lever, a motion transmitting lever having one end thereof mounted on said frame at an axis coincident with the axis about which said supporting wheel swings, a link connecting said levers, and means connecting said motion transmitting lever with said wheel whereby movement of said latter lever causes said frame to be raised and lowered relatively to said wheel.

18. In a plow, the combination of a frame carrying a plow body, a crank axle pivotally mounted on said frame, a supporting wheel journaled on said crank axle, a depth adjusting lever mounted on said frame and extending substantially forwardly, a motion transmitting lever mounted on said frame below said depth adjusting lever and extending forwardly, a link connecting the aforesaid forwardly extending levers, and means actuated by the swinging of said motion transmitting lever for causing said crank axle to swing for raising and lowering said frame.

19. In a plow, the combination of a frame carrying a plow body, a crank axle pivotally mounted on said frame, a supporting wheel journaled on said crank axle, a depth adjusting lever pivotally mounted on said frame at an axis disposed eccentrically to the axis about which the crank axle swings and extending substantially forwardly, a motion transmitting lever having its one end pivotally mounted on said frame at an axis coincident with the axis about which said crank axle swings and extending substantially forwardly, a link connecting the aforesaid forwardly extending levers, and means actuated by the swinging of said motion transmitting lever for causing said crank axle to swing for raising and lowering said frame.

In witness whereof, I hereunto subscribe my name this 27th day of June, 1929.

CARL G. STRANDLUND.